Dec. 23, 1969 ATSUSHI ASADA ET AL 3,486,015

HIGH SPEED DIGITAL ARITHMETIC UNIT WITH RADIX CORRECTION

Filed May 17, 1966 2 Sheets-Sheet 1

INVENTORS
ATSUSHI ASADA
ISAMU WASHIZUKA
BY
ATTORNEY

INVENTORS
ATSUSHI ASADA
ISAMU WASHIZUKA
BY [signature]
ATTORNEY 3,486,015

HIGH SPEED DIGITAL ARITHMETIC UNIT WITH RADIX CORRECTION

Atsushi Asada and Isamu Washizuka, Osaka-shi, Japan, assignors to Hayakawa Denki Kogyo Kabushiki Kaisha, Osaka, Japan, a company of Japan Filed May 17, 1966, Ser. No. 550,758
Claims priority, application Japan, May 24, 1965, 40/30,725, 40/30,726
Int. Cl. G06f 7/385; H03k 19/00
U.S. C. 235—170 3 Claims

ABSTRACT OF THE DISCLOSURE

A high speed digital type arithmetic computer wherein binary coded information is fed into registers, the information in said registers is then judged to determine whether a radix correction should be applied whereup the information is then fed to a full adder. The computer further includes means for shifting the coded information in said registers to effect radix correction by omitting the least significant digit and means for introducing the radix correction and producing a complement of the corrected number before said addition.

The present invention relates to a high speed digital type arithmetic unit, especially to a serial arithmetic unit having no time delay. Although the present invention is applicable not only to binary-coded decimal code, but also to other codes, for the convenience of explanation the following description will be directed to the case of binary-coded decimal code.

In the case of electronic serial arithmetic unit of a type in which numeral value information is indicated in binary-coded decimal number, when two numeral values are added by normal methods a sum thereof is produced at the output of an adder being accompanied with a time delay of 2 to 3 bit times. More specifically, as can be seen from the truth table of binary-coded decimal codes (8421 codes), the codes corresponding to decimal numbers from "0" to "9" are of same form as that of the binary notation, but when it comes to a code corresponding to decimal "10" a carry is made to the next upper digit, and it returns back to "0" again. On the other hand, in the case of binary notation, a carry is made at decimal "8," a next carry is made at decimal "16," and therefore in order to make a carry at binary value "1010" which corresponds to decimal "10" and to reset the code back to "0" at the same time it will do just to treat the binary value "1010" as the binary value "10000."

For the above mentioned purpose, it is necesary to add an operation so that binary value "0110" which is the difference betwen the binary values "10000" and "1010," that is decimal value "6," to numeral values of decimal "10" and above.

At the time of the above mentioned supplementing operation, it is necessary to judge by some means whether or not the numeral value of each digit of the addition output exceeds decimal value "9," and to add decimal value "6" only to the digit which exceeds decimal value "9." Therefore, time is required for said supplementing operation, and it results in a time delay.

On the other hand, in a serial type arithmetic unit, a delay as much as even one bit time is not allowable, and therefore the present arithmetic units various methods in order to compensate for said time delay and to maintain timing constant. However, said conventional compensating methods are complicated, and there is such a disadvantage that various linked problems are met in taking the timing of a series of control system including said compensation of the time delay.

Accordingly, an object of the present invention is to provide a novel high speed digital type arithmetic unit of serial operation type not having the disadvantages discussed above.

Another object is to provide a novel high speed digital type arithmetic unit of serial operation type in which a presence or an absence of a carry is judged from the memory contents of a first operand register and a second operand register, and while an operation is being performed a compensation of a difference due to the different kinds of codes of said registers and an operation device is simultaneously done.

Another object of the present invention is to provide a novel high speed digital type arithmetic unit of serial type in which a circuit which performs said operation together with said simultaneous compensation is simplified.

A further object of the present invention is to provide a novel high speed digital type arithmetic unit of serial type in which said means of supplementing by decimal value "6" is simple but certain.

A still further object of the present invention is to provide a novel high speed digital type arithmetic unit of serial type in which the registered numerical value of binary-coded decimal code is complementized in a simple manner.

In accordance with the present invention, a decimal carry judge logic circuit is provided for making a judgement of a presence or an absence of a carry in accordance with the memory contents of summand and addend registers. This is so arranged that if the judgement by said circuit indicates that a carry is not necessary a mere shift signal is applied to one of said registers so that an addition is done without a carry, and if said judgement indicates that a carry is necesary a shift signal which is accompanied with an addition of binary value "0110" (decimal value "6") is selectively applied to one of said registers, and thereby an addition with a carry is performed.

In accordance with another embodiment of the present invention, it is so arranged in order to obtain same effect as the addition of the decimal value "6" the memory contents of said summand and addend registers are shifted by one bit, then a judgment of a presence or an absence of a carry is made, and in the case of a presence of a carry, a shift signal accompanied by the addition of binary value "011" is selectively applied to one of said registers. First shifting the numeral value information by one bit and subsequent addition of "011" attain same effect as that of an addition of "0110" without a shift. Thus, the constitution of the unit is simplified in accordance with the present invention.

The present invention will be more clearly understood from the explanation hereinafter made referring to the drawings; wherein FIGURE 1 is an explanatory block diagram of functions of a high speed digital type arithmetic unit in accordance with the present invention.

Figure 1:
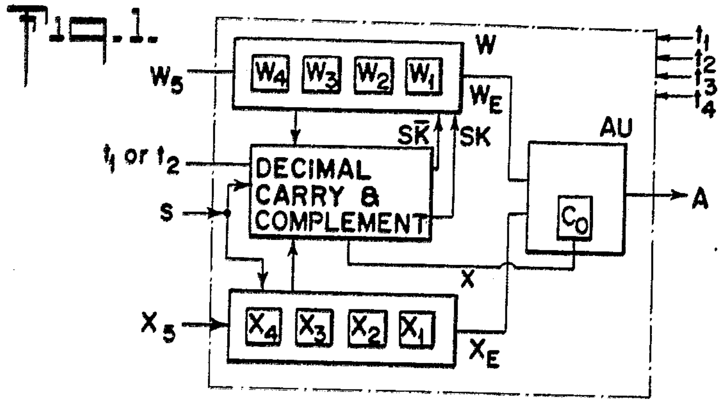

Referring to FIGURE 1, the most important point of the unit of the present invention lies in the decimal carry judge logic circuit whose object is 1 digit of both of the summand and the addend registers, said 1 digit consisting of 4 bits. In the drawing, both of the summand and the addend registers are represented by the symbols of W and X respectively, and only each least significant digit is shown.

The least significant digit (4 bits) respectively is constituted of four memory units which are so arranged from the upper digit to the lower digit as $W_4$, $W_3$, $W_2$, $W_1$ and $X_4$, $X_3$, $X_2$, $X_1$. Since both registers W and X numerical value information serially, they have the function of sequentially rightward shifting due to shift-signal S. Both registers W and X are further connected in order to memory units of upper digits $W_5$, . . . and $X_5$, . . . Both register outputs $W_E$ and $X_E$ of the summand and the addend registers are fed into a full adder which is provided with a carry memory circuit $C_o$, and a sum output A is derived from the output thereof. From the output terminal of said decimal carry judge logic circuit, a mere shift signal $\overline{SK}$ without carry and a shift signal SK having a carry and being accompanied with an addition of decimal value "6" (binary value "0110") are selectively fed into the summand register W. A direct shift signal is fed into the addend register X. In the drawing, $t_1$, $t_2$, $t_3$ and $t_4$ represent bit time signals.

The addend register X herein used is a normal shift register having a function of rightward shift due to the shift signal S, and the application equations regarding its constitutional memory units $X_4$, $X_3$, $X_2$ and $X_1$ are as follows.

$$X_4^{n+1}=(SX_5)^n \qquad (1)$$

$$X_3^{n+1}=(SX_4)^n \qquad (2)$$

$$X_2^{n+1}=(SX_3)^n \qquad (3)$$

$$X_1^{n+1}=(SX_2)^n \qquad (4)$$

The logic equation of the output of said register is as follows.

$$X_E=SX_1 \qquad (5)$$

Now, there are bit time signals $t_1$, $t_2$, $t_3$ and $t_4$ as the signals for determining the timing of bits of said arithmetic unit, and are so synchronized that at respective bit times the lowest bit (fourth place bit), the third place bit, the second place bit and the highest bit (first place bit) respectively appear a the least significant memory unit of each digit.

When the above mentioned synchronization is made, corresponding digits of the summand and the addend, four bits from the upper place respectively, are memorized in each of the memory units $W_4$, $W_3$, $W_2$, $W_1$ and $X_4$, $X_3$, $X_2$, $X_1$ at $t_1$ at each digit time.

On the other hand, when the carry memory circuit $C_o$ in the full adder AU is made with the above mentioned timing to memorize a decimal carry from the lower digit thereof, the combination of the states which nine memory units, $W_4$, $W_3$, $W_2$, $W_1$, $X_4$, $X_3$, $X_2$, $X_1$ and $C_o$ can take at this time and the presence and the absence of carry with respect to said combination are as shown in Table 1 below.

TABLE 1

| $W_4W_3W_2W_1$ | $X_4X_3X_2X_1$ | | | | | | | | | | |
|---|---|---|---|---|---|---|---|---|---|---|---|
| | $C_o$ | 1001 | 1000 | 0111 | 0110 | 0101 | 0100 | 0011 | 0010 | 0001 | 0000 |
| 1001 | 1 | C | C | C | C | C | C | C | C | C | C |
| 1001 | 0 | C | C | C | C | C | C | C | C | C | NC |
| 1000 | 1 | C | C | C | C | C | C | C | C | C | NC |
| 1000 | 0 | C | C | C | C | C | C | C | C | NC | NC |
| 0111 | 1 | C | C | C | C | C | C | C | C | NC | NC |
| 0111 | 0 | C | C | C | C | C | C | C | NC | NC | NC |
| 0110 | 1 | C | C | C | C | C | C | C | NC | NC | NC |
| 0110 | 0 | C | C | C | C | C | C | NC | NC | NC | NC |
| 0101 | 1 | C | C | C | C | C | C | NC | NC | NC | NC |
| 0101 | 0 | C | C | C | C | C | NC | NC | NC | NC | NC |
| 0100 | 1 | C | C | C | C | C | NC | NC | NC | NC | NC |
| 0100 | 0 | C | C | C | C | NC | NC | NC | NC | NC | NC |
| 0011 | 1 | C | C | C | C | NC | NC | NC | NC | NC | NC |
| 0011 | 0 | C | C | C | NC | NC | NC | NC | NC | NC | NC |
| 0010 | 1 | C | C | C | NC | NC | NC | NC | NC | NC | NC |
| 0010 | 0 | C | C | NC | NC | NC | NC | NC | NC | NC | NC |
| 0001 | 1 | C | C | NC | NC | NC | NC | NC | NC | NC | NC |
| 0001 | 0 | C | NC | NC | NC | NC | NC | NC | NC | NC | NC |
| 0000 | 1 | C | NC | NC | NC | NC | NC | NC | NC | NC | NC |
| 0000 | 0 | NC | NC | NC | NC | NC | NC | NC | NC | NC | NC |

In the above table, C represents a presence of a carry, and NC represents an absence of a carry.

For example, the expression of a summand $$(W_4W_3W_2W_1,\ C_o)=0101,0$$

and an addend $(X_4X_3X_2X_1)=0011$ shows the case of 5+3 in which there is no carry from the lower place, the answer is 8, and it is not accompanied with a carry (there is marked NC in the above table.) On the other hand, the expression of $(W_4W_3W_2W_1,C_o)=1001,1$ and $$(X_4X_3X_2X_1)=1000$$

indicates (9+8) with a carry, and the answer is 8 being accompanied with a carry to the next digit. The latter case is marked C in the above table.

Considering the addition of binary-coded decimal numbers, digit values $w$ and $x$ of a summand and an addend, carry $c$ from the lower place, carry $c'$ to the upper place, and digit value $a$ of a sum are interrelated as follows since each digit value is represented by a binary number, when a binary sum is represented by F $(W, x, c)$ $$a=F\ (w,\ x,\ c) \text{ in case } w+x+c\leqq 9 \text{ (that is } c'=0)$$

and $$a=F\ (w,\ x,\ c)+6 \text{ in case } w+x+c\geqq 10 \text{ (that is } c'=1) \qquad (6)$$

For an example of the former, if $w=5$, $x=3$ and $c=0$ $$\begin{array}{rr} w & 0101 \\ x & 0011 \\ c & 0 \\ \hline F(w,x,c) & 1000=8 \end{array}$$

$c'=0$ No-carry

As an example of the latter, if $w=9$, $x=8$ and $c=1$ $$\begin{array}{rr} w & 1001 \\ x & 1000 \\ c & 1 \\ \hline F(w,x,c) & 10010 \\ & 0110 \\ \hline a & 1000=8 \end{array}$$

$c'=1$ There is a carry

If the circuit is so constituted that the presence or the absence of a carry to the upper place digit regarding such states as shown in Table 1 at the bit time $t_1$ is judged utilizing the relation of above Equation 6, in the case of the presence of a carry (it means all of the cases for which C is marked in the above table) not only the summand digits $W_4$, $W_3$, $W_2$ and $W_1$ are shifted rightwardly but also decimal value "6" is simultaneously added during the shift, and said circuit is operated by a judge signal of the presence of a carry (represented by the mark SK in FIGURE 1), thereby a binary output of a sum as it is and a carry signal for a carry from the uppermost place bit thereof to a higher digit are automatically obtained as an output (marked A in FIGURE 1) of the full adder AU.

With respect to a judgment of an absence of a carry (it means all cases marked NC in Table 1), when a mere rightward shift is indicated (by signal marked $\overline{SK}$ in FIGURE 1) the output A of the full adder AU automatically represents a sum thereof. It is apparent from the relation shown in the Equation 6 that it is not necessary to take into consideration regarding a carry to an upper digit.

A serial analysis of the aforementioned examples are shown in Tables 2(a) and 2(b) below.

(a) The case of no-carry to the upper digit (that is the case that a control is made by the signal $\overline{SK}$).

TABLE 2(a)

| | $W_4W_3W_2W_1$ | $W_E=W_1$ | $X_4X_3X_2X_1$ | $X_E=X_1$ | C | A |
|---|---|---|---|---|---|---|
| $t_1$ | 0101 | 1 | 0011 | 1 | (*1) 0 | 0 |
| $t_2$ | 010 | 0 | 001 | 1 | 1 | 0 |
| $t_3$ | 01 | 1 | 00 | 0 | 1 | 0 |
| $t_4$ | 0 | 0 | 0 | 0 | 1 | 1 |
| | | | | | (*2) 0 | |

In the above table, A is the output of the full adder of three inputs of $W_E$, $X_E$ and C. The output A of the full adder AU shows "1000" which is decimal value "8." C is the carry memory circuit of the full adder of three inputs of $W_E$, $X_E$ and C. The logic of both is conventional, and is therefore omitted. (*1) indicates a carry from the lower digit, and (*2) indicates a carry to the upper digit.

(b) The case of a carry to the upper digit (that is the case that a control is made by the signal SK).

TABLE 2(b)

| | $W_4W_3W_2W_1$ | $W_E=W_1$ | $X_4X_3X_2X_1$ | $X_E=X_1$ | C | A |
|---|---|---|---|---|---|---|
| $t_1$ | 1001 | 1 | 1000 | 0 | (*3) 1 | 0 |
| $t_2$ | (*4) 111 | 1 | 100 | 0 | 1 | 0 |
| $t_3$ | 11 | 1 | 10 | 0 | 1 | 0 |
| $t_4$ | 1 | 1 | 1 | 1 | 1 | 1 |
| | | | | | (*5) 1 | |

In the above table, the output A of the full adder AU is indicating "1000" with a carry, that means decimal value "10+8=18." (*3) represents a carry from lower place digit, (*4) represents a state obtained by adding "0110" (decimal value "6") to "1001," and shifting "1111" rightwardly, and (*5) represents the presence of a carry to an upper place digit.

As can be seen from the above examples of calculation made in accordance with the present invention, by making selective control of either one that $W_4$, $W_3$, $W_2$ and $W_1$ are merely shifted rightwardly from the state of nine memory units of $W_4$, $W_3$, $W_2$, $W_1$, $X_4$, $X_3$, $X_2$, $X_1$ and C or that they are shifted rightwardly simultaneously having decimal value "6" being added thereto, it is made possible using normal full adder to automatically obtain as an output therefrom a sum of two binary-coded decimal numbers and a carry to an upper digit.

A logical equation for representing all of the combinations with respect to the mark C of Table 1 is shown below. This means that an instruction signal SK for shifting rightwardly having decimal value "6" being added is obtained, and this signal should be generated at $t_1$ only.

$$\begin{aligned} SK=St_1\{&W_4(X_4+X_3+X_2+W_1X_1+W_1C+X_1C) \\ &+X_4(W_3+W_2+W_1X_1+W_1C+X_1C) \\ &+W_3X_3(W_2+X_2+W_1X_1+W_1C+X_1C) \\ &+W_2X_2(W_3+X_3)(W_1X_1+W_1C+X_1C)\} \end{aligned} \quad (7)$$

All of the controls to be performed by said signal SK, that is all of the states of controls for shifting rightwardly having decimal value "6" added simultaneously, are shown in Table 3.

TABLE 3

| State at $t_1$ | State at $t_2$ | Output at $t_1$ |
|---|---|---|
| $W_4W_3W_2W_1$ | $W_4W_3W_2W_1$ | $W_E$ |
| 0000 | 011 | 0 |
| 0001 | 011 | 1 |
| 0010 | 100 | 0 |
| 0011 | 100 | 1 |
| 0100 | 101 | 0 |
| 0101 | 101 | 1 |
| 0110 | 110 | 0 |
| 0111 | 110 | 1 |
| 1000 | 111 | 0 |
| 1001 | 111 | 1 |

Application and logical equations of the output of each memory unit which satisfy various states as shown in Table 3 are as follow:

$$W_3^{n+1}=(W_4+W_3+W_2)^n \quad (8)$$
$$W_2^{n+1}=(\overline{W}_3\overline{W}_2+W_3W_2)^n \quad (9)$$
$$W_1^{n+1}=(\overline{W}_2)^n \quad (10)$$
$$W_E=W_1 \quad (11)$$

On the other hand, under the instruction signal $\overline{SK}$, instead of the instruction signal SK determined by the Equation 7, the memory units $W_4$, $W_3$, $W_2$ and $W_1$ are to be controlled perform only the rightward shift (necessary in all cases of $t_1$ of the combinations corresponding to NC shown in Table 1 and the cases of $t_2$, $t_3$ and $t_4$), and application and logical equations at this time are as follows.

$$W_3^{n+1}=(W_4)^n \quad (12)$$
$$W_2^{n+1}=(W_3)^n \quad (13)$$
$$W_1^{n+1}=(W_2)^n \quad (14)$$
$$W_E=W_1 \quad (15)$$

The Equations 8–11 and 12–15 should be combined being accompanied with the conditions of respectively corresponding instruction signals, and application and logical equations of each memory unit are conclusively obtained as follows:

$$W_3^{n+1}=\{SK(W_4+W_3+W_2)+\overline{SK}\cdot W_4\}^n \quad (16)$$
$$W_2^{n+1}=\{SK(W_3W_2+\overline{W}_3\overline{W}_2)+\overline{SK}\cdot W_3\}^n \quad (17)$$
$$W_1^{n+1}=(SK\cdot \overline{W}_2+\overline{SK}\cdot W_2)^n \quad (18)$$
$$W_E=SW_1 \quad (19)$$

On the other hand, since the memory unit $W_4$ always receives a control only when the contents are rightwardly shifted from an upper place digit, it follows that the following application equation.

$$W_4^{n+1}=(W_5)^n \quad (20)$$

It is to be noted that, the logical equation of normal full adder which is used in the present invention and an application equation of a carry memory unit included therein are as follows.

$$A=W_EX_EC+W_E\overline{X}_E\overline{C}+\overline{W}_EX_E\overline{C}+\overline{W}_E\overline{X}_EC \quad (21)$$
$$C^{n+1}=(W_EX_E+W_EC+X_EC)^m \quad (22)$$

In accordance with the present invention, by the use of memory units having properties indicated by the above explained Equations 1–4, 5, 7, and 16–21 and respective signals it has become possible to accomplish the operations above explained and to simply obtain a sum of two binary-coded decimal numbers without being accompanied by a time delay which is otherwise required for compensation.

Figure 4:
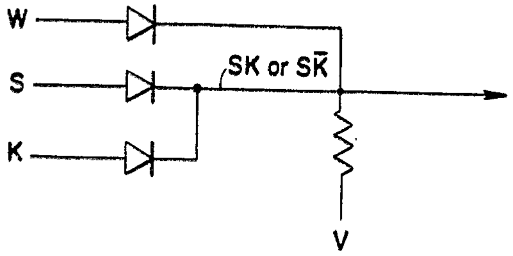
FIGURE 4 is an equivalent circuit of an "and" gate used in the logic circuit.
Figure 2:
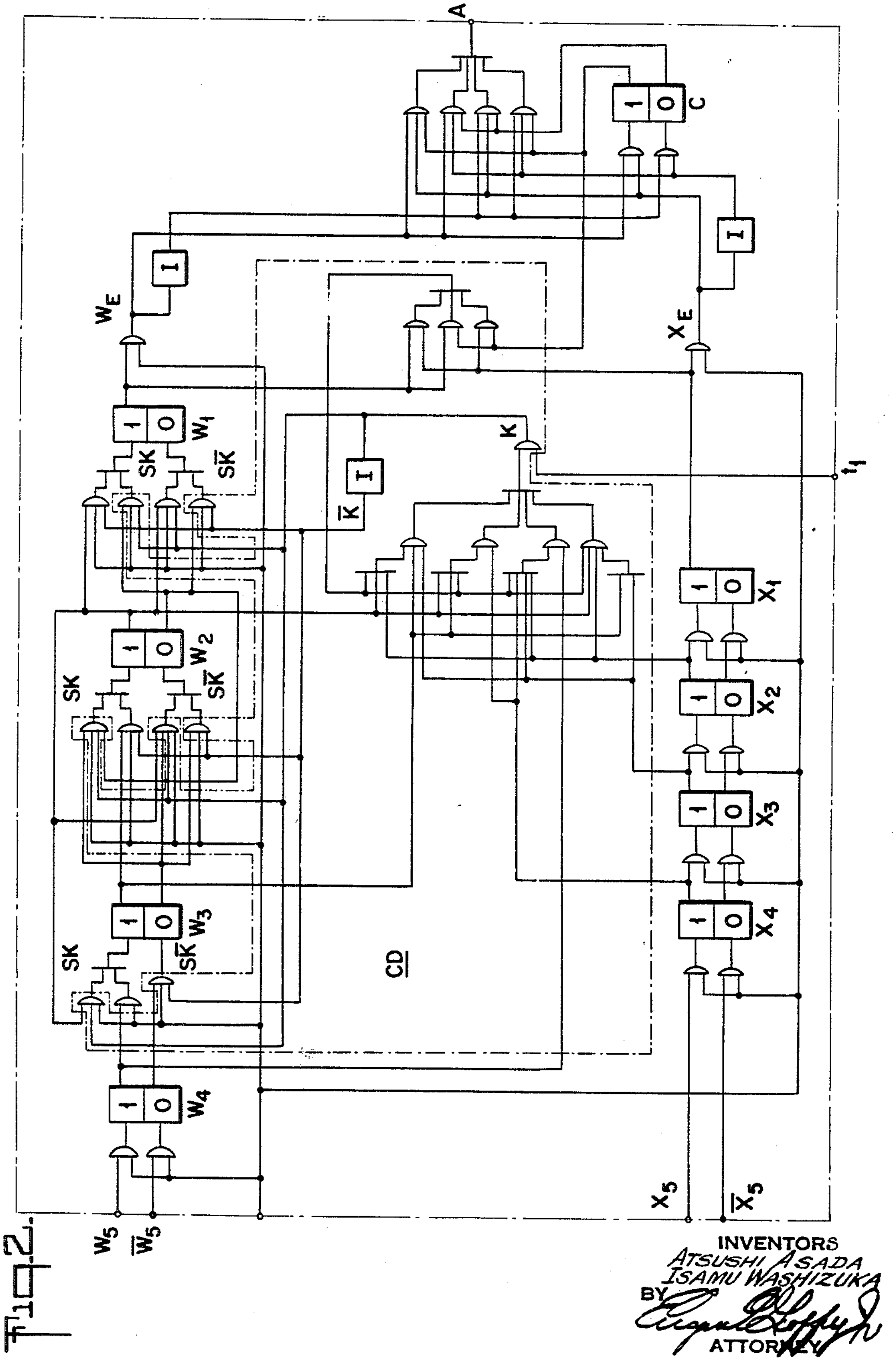
FIGURE 2 is a schematic diagram of a logic circuit thereof.

As an example of embodiment of the present invention, FIGURE 2 shows a full logic circuit diagram in accordance with present invention in which an R–S flip-flop circuit is used in each of the memory units and respectively corresponding input equations are figured. The symbols in the drawing are same as those of FIGURE 1, and the explanation of the circuit is omitted. For clarity, an equivalent "and" gate circuit is illustrated in FIGURE 4 to show the generation of SK and $\overline{SK}$ signals.

At the bit time $t_1$ in the previously explained example of embodiment of the present invention the presence or the absence of a carry is judged by the decimal carry judge logic circuit CD, but in a modification of the embodiment of the present invention it is possible to make a correct judgment at the bit time $t_2$ which is later by one than said $t_1$. More specifically, the presence or the absence of a decimal carry to an upper place digit can be judged in accordance with the states of respective upper place three bits of the summand and the addend at the bit time $t_2$ (the contents of six memory units $W_3$, $W_2$, $W_1$, $X_3$, $X_2$ and $X_1$).

When each of the summand and the addend is shifted rightwardly, as to the carry the contents obtained in accordance with the logic of the normal binary full adder are applied, and the classification of carry C and no-carry NC corresponding to the combinations of the time are made to correspond, the following Table 4 can be obtained without encountering any discrepancy.

TABLE 4

| | | $X_3X_2X_1$ | | | | |
|---|---|---|---|---|---|---|
| | $C_o$ | 100 | 011 | 010 | 001 | 000 |
| $W_3W_2W_1$: | | | | | | |
| 100 | 1 | C | C | C | C | C |
| 100 | 0 | C | C | C | C | NC |
| 011 | 1 | C | C | C | C | NC |
| 011 | 0 | C | C | C | NC | NC |
| 010 | 1 | C | C | C | NC | NC |
| 010 | 0 | C | C | NC | NC | NC |
| 001 | 1 | C | C | NC | NC | NC |
| 001 | 0 | C | NC | NC | NC | NC |
| 000 | 1 | C | NC | NC | NC | NC |
| 000 | 0 | NC | NC | NC | NC | NC |

In the above, $C_o$ is memorized in the carry memory circuit in the full adder AU, and represents the absence or the presence of a decimal carry from a lower place digit.

For example, the state is as follows in case at the time $t_1$ the summand ($W_4$, $W_3$, $W_2$ $W_1$, $C_0$)="0101," 0 and the addend ($X_4$, $X_3$, $X_2$, $X_1$)="0011."

| | $W_4W_3W_2W_1$ | $X_4X_3X_2X_1$ | C |
|---|---|---|---|
| $t_1$ | 0101 | 0011 | 0 |
| $t_2$ | 010 | 001 | 1 |

In this case, there is marked NC in the table.

On the other hand, the following represents the case that the summand ($W_4W_3W_2W_1$, $C_0$)="1001," 1 and the addend ($X_4$, $X_3$, $X_2$, $X_1$)="1000."

| | $W_4W_3W_2W_1$ | $X_4X_3X_2X_1$ | C |
|---|---|---|---|
| $t_1$ | 1001 | 1000 | 1 |
| $t_2$ | 100 | 100 | 1 |

In this case, there is marked C in the table.

A logical equation representative of all of the combinations corresponding to the carry mark C in the Table 4 can be attained as follows.

$$SK=St_2\{W_3(X_3+X_2+X_1+C_o)+X_3(W_2+W_1+C_o)+W_2X_2(W_1+X_1+C_o)+W_1X_1C_o(W_2+X_2)\} \quad (1')$$

When a performance of a control of rightward shift having decimal "6" being simultaneously added at the timing of $t_2$, the previously mentioned examples are illustrated tables 5(a) and 5(b).

(a) The case of no-carry to an upper place digit (the case of control by the signal $S\overline{K}$).

TABLE 5(a)

| | $W_4W_3W_2W_1$ | $W_E$ | $X_4X_3X_2X_1$ | $X_E=X_1$ | C | A |
|---|---|---|---|---|---|---|
| $t_1$ | 0101 | 1 | 0011 | 1 | 0 | 0 |
| $r_2$ | 010 | (*) | 001 | 1 | 1 | 0 |
| $t_3$ | (*)201 | 1 | 00 | 0 | 1 | |
| $t_4$ | 0 | 0 | 0 | 0 | 1 | 1 |
| $t_1$ | | | | | 0 | |

In the above table, A is a full adder output of three inputs of $W_E$, $X_E$ and C. C is a memory circuit of carry in the full adder of three inputs of $W_E$, $X_E$ and C. The logic of both is conventional and explanation is omitted. (*1) indicates that $W_E=W_1$ in the case of $\overline{SK}$, and (*2) indicates a mere rightward shift in the case of $\overline{SK}$.

(b) The case of a carry to an upper place digit (the case of control by the signal SK).

TABLE 5(b)

| | $W_4W_3W_2W_1$ | $W_E$ | $X_4X_3X_2X_1$ | $X_E=X_1$ | C | A |
|---|---|---|---|---|---|---|
| $t_1$ | 1001 | 1 | 1000 | 0 | 1 | 0 |
| $t_2$ | 100 | (*3)1 | 100 | 0 | 1 | 0 |
| $t_3$ | (*4)11 | 1 | 10 | 0 | 1 | 0 |
| $t_4$ | 1 | 1 | 1 | 1 | 1 | 1 |
| $t_1$ | | | | | 1 | |

As the output in the above table shows "1000" with a carry, is the decimal value "18."

In the above case, SK is indicated at $t_2$, therefore the number to be added is not "0110" but is "011", thus "011" is added to "100," and the output $W_E$ and next state shifted rightwardly are determined with respect to the resultant "111." (*3) represents $W_E=1$ (in this case only $W_E=W_1$), and (*4) represents the state "11," that is "111" is shifted rightwardly.

Following the manner of the above Table 5(b), the controls to be performed by the signal SK in connection with the combinations corresponding to C of Table 4 are shown in the following Table 6.

TABLE 6

| State at $t_3$ | State at $t_3$ | Output at $t_2$ |
|---|---|---|
| $W_3W_2W_1$ | $W_3W_2W_1$ | $W_E$ |
| 000 | 01 | 1 |
| 001 | 10 | 0 |
| 010 | 10 | 1 |
| 011 | 11 | 0 |
| 100 | 11 | 1 |

Application equations and the logical equation of the output which satisfy various states shown in Table 6 are as follows.

$$W_2^{n+1}=(W_3+W_2+W_1)^n \quad (2')$$

$$W_2^{n+1}=(W_2W_1+\overline{W}_2\overline{W}_1)^n \quad (3')$$

$$W_E=\overline{W}_1 \quad (4')$$

The control in the case of $\overline{SK}$ of $X_4$, $X_3$, $X_2$, $X_1$, $W_4$, $W_3$, $W_2$ and $W_1$ is a mere rightward shift, and the input equations and logical equation of the output of each memory unit can be conclusively attained as follows.

$$X_4^{n+1}=(SX_5)^n \quad (5')$$

$$X_3^{n+1}=(SX_4)^n \quad (6')$$

$$X_2^{n+1}=(SX_3)^n \quad (7')$$

$$X_1^{n+1}=(SX_2)^n \quad (8')$$

$$X_E=SX_1 \quad (9')$$

$$W_4^{n+1}=(SW_5)^n \quad (10')$$

$$W_3^{n+1}=(SW_4)^n \quad (11')$$

$$W_2^{n+1}=\{SK(W_3+W_2+W_1)+S\overline{K}W_3\}^n \quad (12')$$

$$W_1^{n+1}=\{SK(W_2W_1+W_2W_1)+S\overline{K}W_2\} \quad (13')$$

$$W_E=SKW_1+SKW_1 \quad (14')$$

The embodiment of the present invention can perform the aforementioned operation by the use of memory units having properties expressed in Equations 1′ and 5′ to 14′ and said signals, and can simply obtain a sum of two binary-coded decimal numbers without being accompanied with a time delay which otherwise is required for said compensation.

Figure 3:
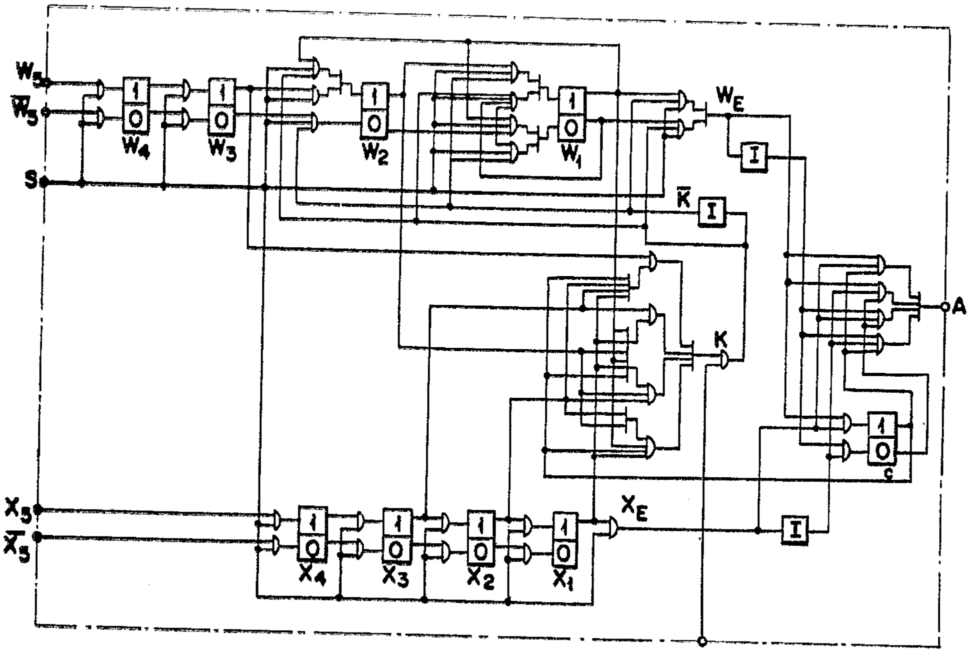
FIGURE 3 is a schematic diagram of a modification of said logic circuit.

FIGURE 3 shows a full logic circuit diagram of said modifications of the embodiment of the present invention in which the previously explained R–S flip flop circuit is used in each of the memory units and corresponding input equation is attained. The symbols in the drawing are same as those of FIGURE 1.

An accompanying feature of the adder in accordance with the present invention is that by the utilization of the circuit function of the rightward shifting having a decimal value "6" being simultaneously added due to said signal SK it can be effectively combined and used as a complement unit of binary-coded decimal number.

Suppose a complement of a certain number with respect to 9 is to be obtained. This requires the production of the complement of each of decimal digit value with respect to 9, and the following relation exists between the original digit value "a" and its complement $(\bar{a})$ with respect to 9.

$$(\bar{a})=9-\text{“}a\text{”} \text{ (decimal expression)} \qquad (23)$$

When the digit value "$a$" is indicated in a binary code, if a complement of each bit is taken (that is to convert 1 to 0 and 0 to 1), this means to complementize "1111," that is the decimal value "15," then the following relation exists between the original binary numbers $a_1$, $a_2$, $a_3$ and $a_4$ and the complements $\bar{a}_1$, $\bar{a}_2$, $\bar{a}_3$ and $\bar{a}_4$.

$$(\bar{a}_1\bar{a}_2\bar{a}_3\bar{a}_4)=(1111)-(a_1a_2a_3a_4) \text{ (binary expression)} \qquad (24)$$

The above two Equations 23 and 24 are combined in such relation as "$a$" (decimal expression)$=a_1a_2a_3a_4$ (binary expression), and $(\bar{a})$ to be obtained can be expressed as follows.

$$\begin{aligned}(\bar{a})&=9-\text{“a”}\\&=15-\text{“}a\text{”}-6 \text{ (decimal expression)}\\&=\text{“1111”}-(a_1a_2a_3a_4+\text{“0110”}) \text{ (binary expression)}\end{aligned} \qquad (25)$$

When the Equations 25 and 24 are compared, it can be clearly seen that the Equation 25 has the following meaning.

"A complement of a digit value '$a$' with respect to 9 is equal to a number obtained by adding '0110' (decimal value 6) to the binary expression of '$a$,' that is $a_1a_2a_3a_4$ and complementizing the sum thereof with respect to 15, that is by converting each bit value of said sum in such manner as 1 to 0 and 0 to 1."

The control to add the decimal value "6" is possible by always making $K=1$ as was previously explained, and the conversion from 1 to 0 and from 0 to 1 can be simply accomplished by making it to pass through a stage of inversion. Thus, the adder in accordance with the present invention has a large advantage that it can be effectively used to produce a complement unit of 9 with respect to the contents of the summand register when the following instruction is specially applied.

$$\begin{aligned}&K=1\\&\text{Complementized output}=\overline{W}_E\end{aligned} \qquad (26)$$

Further, it is apparent that the circuit device in accordance with the present invention can be utilized as a subtracter when said function of a complement unit is added to said binary-coded decimal number adder.

What is claimed is:

1. A high speed serial digital arithmetic computer with radix correction comprising at least two registers each having a plurality of memory elements for registering first and second operands represented by binary coded decimal numbers, a judging circuit interconnected with said registers and responsive to said stored binary codes to produce a first signal if the computation will involve the next upper decimal digit and a second signal if the computation will not involve the next upper decimal digit, means supplying one of said judging signals to one of said registers, said first judging signal applying a radix correction to said one register, a full adder, and means for feeding the information in said registers after the application of said judging signal to said full adder to produce a sum of the binary coded decimal numbers in said registers.

2. A high speed serial digital arithmetic computer with radix correction according to claim 1 including means to shift the binary coded decimals in said registers by one bit, and then applying one of said judging signals, said first judging signal omitting the least significant bit of said radix correction, said judging signal being determined by the three last significant bits in said registers following said shift.

3. A high speed serial digital arithmetic computer with radix correction according to claim 1 including means for producing said judging signal to apply a radix correction to one of said registers, whereupon information in the last said register may be inverted to produce the complement of the binary coded information stored therein.

References Cited

UNITED STATES PATENTS

| | | | |
|---|---|---|---|
| 3,089,644 | 5/1963 | Wensley | 235—170 X |
| 3,083,910 | 4/1963 | Berkin | 235—170 X |
| 3,112,396 | 11/1963 | Heywood | 235—176 X |
| 2,943,790 | 7/1960 | Berezin et al. | 235—170 |
| 2,923,474 | 2/1960 | Blankenbaker | 235—170 |

OTHER REFERENCES

R. Townsend: Serial Digital Adders For a Variable Radix of Notation, Electronic Engineering, October 1953, pp. 410–416.

R. K. Richards Arithmetic Operations in Digital Computers, 1955, page 179.

EUGENE G. BOTZ, Primary Examiner

DAVID H. MALZAHN, Assistant Examiner

U.S. Cl. X.R.

235—176